(12) United States Patent
Goodman et al.

(10) Patent No.: US 7,340,569 B2
(45) Date of Patent: Mar. 4, 2008

(54) COMPUTER ARCHITECTURE PROVIDING TRANSACTIONAL, LOCK-FREE EXECUTION OF LOCK-BASED PROGRAMS

(75) Inventors: James R. Goodman, Madison, WI (US); Ravi Rajwar, Portland, OR (US)

(73) Assignee: Wisconsin Alumni Research Foundation, Madison, WI (US)

( * ) Notice: Subject to any disclaimer, the term of this patent is extended or adjusted under 35 U.S.C. 154(b) by 369 days.

(21) Appl. No.: 10/775,448

(22) Filed: Feb. 10, 2004

(65) Prior Publication Data

US 2005/0177831 A1 Aug. 11, 2005

(51) Int. Cl.
*G06F 13/00* (2006.01)

(52) U.S. Cl. .................. 711/151; 711/152; 711/150; 711/158; 711/141

(58) Field of Classification Search .................. None
See application file for complete search history.

(56) References Cited

U.S. PATENT DOCUMENTS

| | | | |
|---|---|---|---|
| 4,318,182 A | | 3/1982 | Bachman et al. |
| 4,320,451 A | | 3/1982 | Bachman et al. |
| 5,136,691 A | | 8/1992 | Baror |
| 5,185,878 A | | 2/1993 | Baror et al. |
| 6,006,299 A | * | 12/1999 | Wang et al. ............... 710/108 |
| 6,014,728 A | | 1/2000 | Baror |
| 6,360,220 B1 | * | 3/2002 | Forin ......................... 707/8 |
| 6,460,124 B1 | | 10/2002 | Kagi et al. |
| 6,651,146 B1 | * | 11/2003 | Srinivas et al. ............. 711/150 |
| 6,938,130 B2 | * | 8/2005 | Jacobson et al. ........... 711/144 |
| 2003/0221071 A1 | * | 11/2003 | McKenney et al. ......... 711/152 |
| 2004/0162948 A1 | * | 8/2004 | Tremblay et al. ............ 711/137 |
| 2004/0162951 A1 | * | 8/2004 | Jacobson et al. ........... 711/143 |

OTHER PUBLICATIONS

Ravi Rajwar, Speculation-based Techniques for Transactional Lock-free Execuation of Lock-based Programs[online], Sep. 2002. [retrieved on Feb. 27, 2006]. Retrieved from the Internet: <URL:www.cs.wisc.edu/arch/uwarch/theses/rajwar.pdf>.*
Ravi Rajwawr and James R. Goodman, Speculative Lock Elision: Enabling Highly Concurrent Multithread Execuation, 34th International Symposium [online], Dec. 3-5, 2001[retrieved on Feb. 27, 2006]. Retrieved from the Internet:<URL:www.cs.wisc.edu/~rajwar/papers/micro01.pdf>.*
Jason Liu, David M. Nicol, and King Tan, Lock-free Scheduling of Logical Processes in Parallel Simulation, May 12-18, 2001, IEEE.*
James H. Anderson and Srikhanth Ramamurthy, A Framework for Implementing Objects and Scheduling Tasks in Lock-Free Real-Time Systems, Dec. 4-6, 1996, IEEE.*

(Continued)

*Primary Examiner*—Reginald Bragdon
*Assistant Examiner*—Thanh D. Vo
(74) *Attorney, Agent, or Firm*—Boyle Fredrickson S.C.

(57) ABSTRACT

Hardware resolution of data conflicts in critical sections of programs executed in shared memory computer architectures are resolved using a hardware-based ordering system and without acquisition of the lock variable.

21 Claims, 6 Drawing Sheets

OTHER PUBLICATIONS

Ravi Rajwar, Speculation-based Techniques for Transactional Lock-free Execuation of Lock-based Programs[online], Sep. 2002. [retrieved on Feb. 27, 2006]. Retrieved from the Internet: <URL:www.cs.wisc.edu/arch/uwarch/theses/rajwar.pdf>.*

Henry Massalin and Calton Pu, A Lock-free Multiprocessor OS Kernel Jun. 19, 2991, Columbia University, pp. 4-5, and 8.*

James R. Goodman, et al., Efficient Synchronization Primitives For Large-Scale Cache-Coherent Multiprocessors, 1989 ACM 0-89791-300-0/89/0004/0064, Computer Sciences Department, University of Wisconsin-Madison, Madison, Wisconsin.

* cited by examiner

COMPUTER ARCHITECTURE PROVIDING TRANSACTIONAL, LOCK-FREE EXECUTION OF LOCK-BASED PROGRAMS

CROSS-REFERENCE TO RELATED APPLICATIONS

BACKGROUND OF THE INVENTION

The present invention relates to computers with shared-memory architectures and in particular, to an architecture providing improved handling of conflicts that occur in the access of shared data.

Multi-threaded software provides multiple execution "threads" which act like independently executing programs. An advantage to such multi-threaded software is that each thread can be assigned to an independent processor, or to a single processor that provides multi-threaded execution, so that the threads may be executed in parallel for improved speed of execution. For example, a computer server for the Internet may use a multi-threaded server program where each separate client transaction runs as a separate thread.

Each of the threads may need to modify common data shared among the threads. For example, in the implementation of a transaction based airline reservation system, multiple threads handling reservations for different customers may read and write common data indicating the number of seats available. If the threads are not coordinated in their use of the common data, serious errors can occur. For example, a first thread may read a variable indicating an airline seat is available and then set that variable indicating that the seat has been reserved by the thread's client. If a second thread reads the same variable prior to its setting by the first thread, the second thread may, based on that read, erroneously set that variable again with the result that the seat is double booked.

To avoid these problems, it is common to use synchronizing instructions to delineate portions of a thread (often called critical sections) where simultaneous execution by more than one thread might be a problem. A common set of synchronizing instructions implement a lock, using a lock variable having one value indicating that it is "held" by a thread and another value indicating that it is available. A thread must acquire the lock before executing the critical section and does so by reading the lock variable and if the lock variable is not held by another thread, writing a value to the lock variable indicating that it is held. When the critical section is complete, the thread writes to the lock variable a value indicating that the lock is available again or "free".

Typically, the instructions used to acquire the lock are "atomic instructions", that is, instructions that cannot be interrupted once begun by any other thread or quasi-atomic instructions that can be interrupted by another thread, but that make such interruption evident to the interrupted thread so that the instructions can be repeated.

While the mechanism of locking a critical section for use by a single thread effectively solves conflict problems, that is, where two threads need to access a variable and at least one is writing, it can reduce the benefits of parallel execution of threads by forcibly serializing the threads as they wait for a lock. This serialization can be reduced by using a number of different locks associated, for example, with different small portions of shared-memory. In this way, the chance of different threads waiting for a lock on a given portion of shared-memory is reduced.

Generally, multiple locks increases the complexity of the programming process and thus creates a tradeoff between program performance and program development time. Even with multiple locks, serialization of the threads may occur.

U.S. patent application Ser. No. 10/037,041 entitled: "Concurrent Execution of Critical Sections by Eliding Ownership of Locks" describes a method of improving the execution of locked critical sections by multiple threads in which the threads do not acquire the lock but speculatively execute the critical section while omitting, or "eliding," lock acquisition and release. During the speculative execution of the critical section, actual conflicts between threads in the acquisition of data of the critical section are monitored. If no actual conflicts occur, the speculative execution is committed, meaning that the data generated by the execution of the speculative section is written to shared memory.

This lock elision saves some time by avoiding the steps of acquiring and releasing the lock. More importantly, however, lock elision allows multiple threads to simultaneously execute the critical section, without serialization, so long as no actual conflicts in data acquisition occur.

At times, during speculative execution of a critical section under lock elision, there will be an actual conflict between two threads needing to access the same data. When such a conflict is detected, the speculative execution is "squashed" and the threads begin execution of the critical section from the beginning. The threads may retry speculative execution of the critical section, but ultimately the threads revert to actual acquisition of the lock in order to ensure that the critical section can be completed within a reasonable period of time. In these cases of actual conflict between threads, the problems inherent in lock-based synchronization return.

SUMMARY OF THE INVENTION

The present invention allows lock-free access to shared data even in the presence of conflicts between threads. A hardware mechanism orders conflicting threads allowing at least one thread to continue without restarting, while ordering the conflicting threads to ensure their efficient subsequent execution. The conflict resolution does not require the acquisition of the lock by any thread and thus preserves the ability of non-conflicting threads to execute the critical section speculatively. The technique used by the invention can eliminate "live-lock" situations between threads and ensures that no thread is precluded from ever obtaining the shared data.

Specifically the present invention provides a shared-memory computer element having a processor and a local memory, the latter having a controller executing a protocol to share data with at least one other shared-memory computer element. The shared-memory computer element also includes a conflicts resolution circuit executing a hardware program to detect a critical section in an executing program and begin speculative execution of the critical section without acquisition of a lock. The conflicts resolution circuit further, in the event of a conflict with another processor unit, establishes a priority between the processor units to resolve the conflict without acquisition of the lock.

Thus, it is one object of at least one embodiment of the invention to provide a hardware solution to data sharing conflicts that does not require acquisition of the lock. By avoiding lock acquisition, the present invention provides in hardware "failure atomicity" that is, a certainty that a software transaction, for example lock acquisition and release, will not fail half-done.

It is another object of one embodiment of the invention to provide a solution that provides a simple ordering among conflicting processor units.

The processor unit may further include a critical section detection circuit detecting the start and end of execution by the processor of a critical section of a program subject to a lock and the conflicts resolution circuit may communicate with the critical section detection circuit to defer or release data according to a time stamp order only during execution of a critical section.

Thus, it is another object of an embodiment of the invention to provide a conflict resolution mechanism that works with lock elision-type procedures to allow lock free resolution of conflicts.

The conflicts resolution circuit may defer to the protocol of the local memory during execution of a section of the program that is not a critical section. The protocol of the local memory may be a cache coherence protocol.

It is another object of an embodiment of the invention to provide a system that may make use of conventional cache coherence protocols used in shared-memory computers.

The globally unique clock may include a time variant field and a static processor-unit-dependant field.

It is yet another object of an embodiment of the invention to provide a clock that provides time stamps that are ensured to be unique with practical synchronization standards for use with the present invention.

The globally unique clock may be a counter updated after executions by the processor of a critical section of a program subject to a lock.

Thus, it is another object of an embodiment of the invention to provide a time base that eliminates unnecessary incrementing and large counter size.

The counter may update by setting itself to a higher number including possibly the time stamp of the request of a deferred processor unit.

It is thus another object of an embodiment of the invention to manage drift between independent clocks.

The instant processor unit may further include buffer memory storing the deferred request of the other processor unit and the conflicts resolution circuit may execute to read the buffered deferred requests at a time after the deferring to release data to the other processor unit.

It is thus another object of an embodiment of the invention to provide an orderly access to data by deferred processor units.

The conflicts resolution circuit further executes the hardware program to send a marker message to the second processor unit when the request by the second processor unit is deferred based on its time stamp, and to send a marker message to the second processor unit when the request by the second processor unit is deferred because the requested data is not available, and to send a probe message to a third processor unit containing a time stamp of the request of a second processor unit receiving the marker message, and to respond to a probe message to a second processor unit that has sent the processor unit a marker message indicating that a request by the processor unit has been deferred, the probe message indicating a time stamp of a third processor unit earlier than the time stamp of the request used by processor unit to acquire that data, the probe message being from a third processor unit requesting the data from the second processor unit.

It is yet another object of an embodiment of the invention to provide additional mechanisms for detecting and resolving conflicts that may occur between multiple processor units contending for multiple variables.

The processor unit may include buffer memory storing deferred requests from the other processor unit and/or store values from speculative execution. The conflicts resolution circuit may further execute the hardware program to buffer deferred requests and speculate while buffer memory is available; and revert to a default condition, such as lock acquisition or failure signaling, when buffer memory is exhausted.

It is thus another object of an embodiment of the invention to provide a system that may be flexibly used in a variety of architectures having different amounts of buffer memory and thus to allow precise control of tradeoffs between speed and component costs.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1:
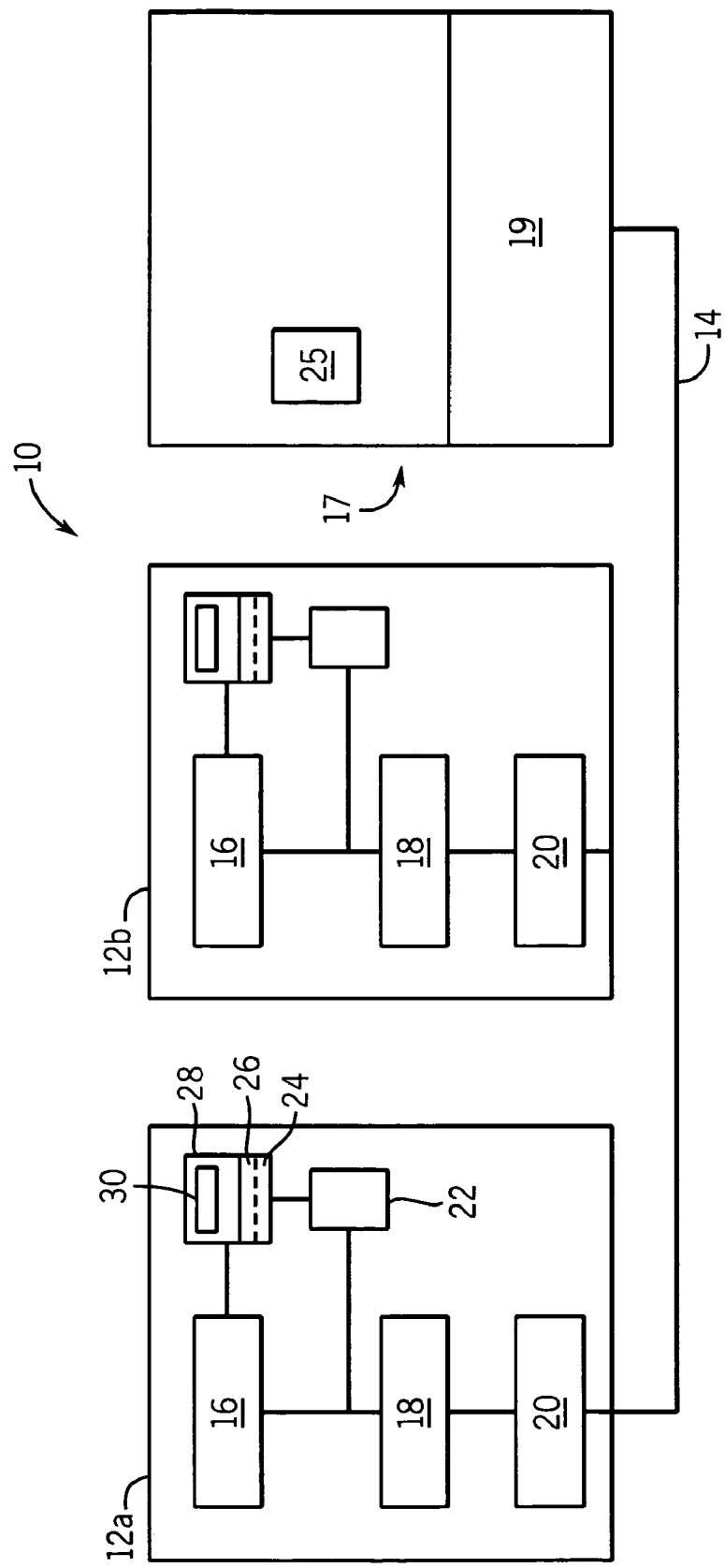
FIG. 1 is a simplified block diagram of a multiprocessor computer having multiple processor units implementing shared-memory.

Referring now to FIG. 1, a multiprocessor, shared-memory computer 10 for use with the present invention includes a number of processor units including processor units 12a and 12b connected on a common bus structure 14 to a shared-memory 17.

Only two processor units 12a and 12b are shown for clarity, however, typically many more processors will be used. The shared-memory 17 is depicted logically as a single device, but in fact will often be distributed among the processor units 12 according to methods known in the art.

Processor units 12a and 12b each include a processor 16 communicating with an L1 cache 18, an L2 cache 20 and a cache controller 22 as is well understood in the art. The shared-memory 17 includes a memory controller 19 executing standard cache protocols to allow sharing of shared data 25 among various ones of the L2 caches 20 of the particular processor units 12*a* and 12*b*. Under this sharing, the L2 cache 20 may be granted "owner" status for writing values to shared data 25 or "shared" status allowing for reading only of the shared data 25. A "pending" status indicates that the L2 cache 20 is awaiting ownership or shared status, while an "invalid" status indicates that the L2 cache 20 has lost ownership or shared status. Losing ownership status may result in data reverting to shared status or to invalid status as will be understood to those of ordinary skill in the art.

A change in status of shared data 25 owned by the L2 cache 20 is normally effected by a message passing to the L2 caches 20 (actually or logically). For example, the status of shared data 25 owned by a first L2 cache 20 may change to invalid status upon receipt of a message from another L2 cache 20 seeking ownership or sharing of that shared data 25. Cache coherence protocols are well known in the art and may include "snooping" protocols as well as protocols employing directories, also applicable to the present invention.

Each processor unit 12*a* and 12*b* may execute a different program thread in parallel, the threads being different programs or different portions of the same program. These threads may include the execution of critical sections protected by a lock variable (Q) which must be acquired before storing data in the critical section.

Consider now two critical sections for different programs executed by processor unit 12*a* and 12*b* as follows:

| Processor unit 12a | Processor unit 12b |
|---|---|
| LOCK(Q) | LOCK(Q) |
| . | . |
| . | . |
| . | . |
| Store VAR1 | Store VAR2 |
| . | . |
| . | . |
| . | . |
| Store VAR2 | Store VAR1 |
| . | . |
| . | . |
| . | . |
| UNLOCK(Q) | UNLOCK(Q) |

The instructions LOCK and UNLOCK represent atomic instructions acquiring and releasing a lock variable Q whereas the Store instructions represent a writing of a value to two different data areas (VAR1 or VAR2) protected by the lock. While these two critical sections store data in different orders a similar problem can occur with identical critical sections as a result of out-of-order execution that can occur with modern processors.

Referring again to FIG. 1, the processor units 12*a* and 12*b* provide additionally critical section detection circuitry 26, lock elision circuitry 24 as described in co-pending application Ser. No. 10/037,041 filed Oct. 19, 2001 by the present inventors, assigned to the assignee of the present invention, and hereby incorporated by reference.

Using the critical section detection circuitry 26 and lock elision circuitry 24 the above critical sections may be initially executed speculatively by each processor unit 12*a* and 12*b* without acquisition of the lock variable Q. In such case a live-lock may occur.

Figure 2:
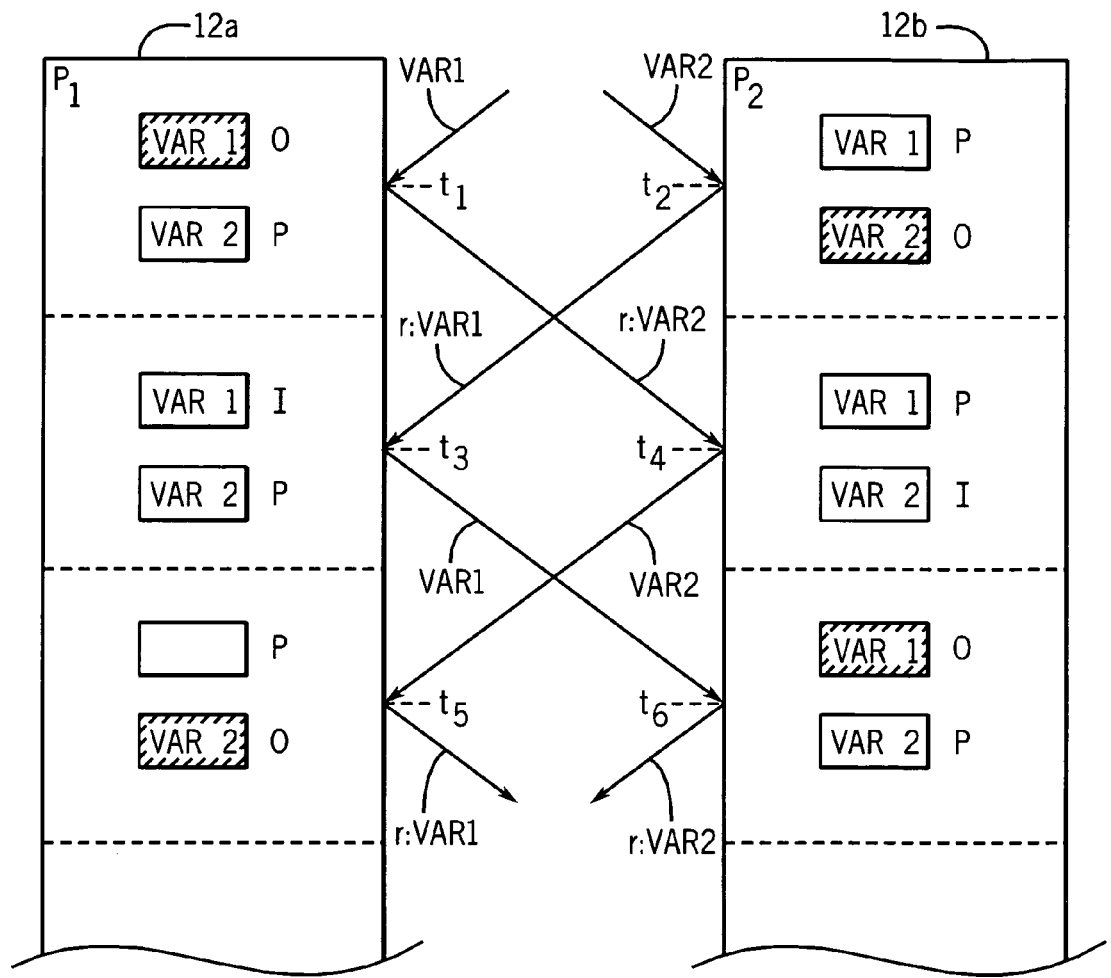
FIG. 2 is a data flow diagram showing the speculative execution of critical sections by two of the processor units of FIG. 1 such as may lead to a "live-lock" situation.

As shown in FIG. 2, after the elision of lock variable Q, at a first time $t_1$ processor unit 12*a* may acquire variable VAR1 for ownership using standard cache protocols per instruction Store VAR1. Variable VAR1 is marked with an M in FIG. 2 indicating that it is owned. Likewise processor unit 12*b* may acquire variable VAR2 received for ownership per instruction Store VAR2.

At time $t_1$ processor unit 12*a* may execute the Store VAR2 instruction and will send a request message (r:VAR2) to processor unit 12*b* requesting variable VAR2 for ownership. Likewise, at time $t_2$, processor unit 12*b* may execute the Store VAR1 instruction and will send a request message (r:VAR1) processor unit 12*a* requesting variable VAR1 for ownership.

At time $t_3$ processor unit 12*a* receives B's request r:VAR1 and invalidates its copy of VAR1 because this request r:VAR1 indicates that there in fact has been a conflict during the speculative execution of the critical section executed by processor unit 12*a* evidenced by another processor wishing to store the to same variable VAR1. Accordingly at time $t_3$ processor unit 12*a* restarts, squashing its speculative execution up to that point.

Likewise, at time $t_4$ processor unit 12*b* receives request r:VAR2 from processor unit 12*a* and squashes its speculative execution after invalidating its cache entry. Processor unit 12*a* holds or may hold a copy of VAR2 in a pending status (P) indicating that it is not writeable at this time or may not have a copy of VAR2. Likewise, processor unit 12*b* may hold variable VAR1 in a pending status or may not have variable VAR2.

After restarting at $t_3$, processor unit 12*a* responds to the data requested by processor unit 12*b* which now obtains variable VAR1 for ownership. Likewise processor unit 12*b* after restarting at $t_3$, responds to the pending request by processor unit 12*a* with the value of VAR2 which is now owned by processor unit 12*a*.

The net effect is that the processor units 12*a* and 12*b* have simply switched positions. Each processor unit 12*a* and 12*b* in continuing execution of their critical sections again requests its missing variables VAR1 and VAR2, respectively, and by sending requests for these variables, invalidates the variable of the other, starting the conflict over again.

This live lock conflict is potentially perpetual, and for this reason the above referenced Ser. No. 10/037,041 application discloses a retry limit after which speculation is dropped by the processor unit 12*a* and 12*b* and they revert to a conventional lock acquisition mode.

Figure 3:
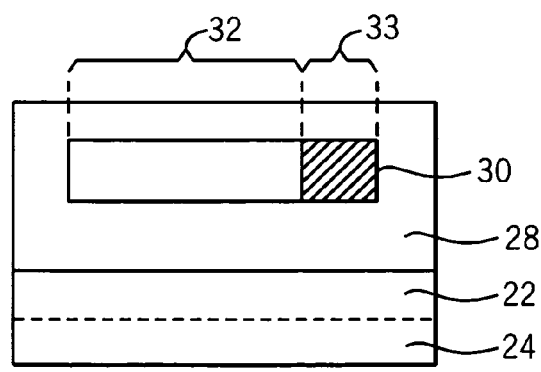
FIG. 3 is a block representation of circuitry within the processor units of FIG. 1 providing section detection, lock elision, and conflict resolution, the later circuitry including a globally unique clock.

Referring now to FIGS. 1 and 3, the present invention provides conflict resolution circuitry 28 in addition to the critical section detection circuitry 26, lock elision circuitry 24 described above and in the referenced patent application. This conflict resolution circuitry 28 prevents this live lock from occurring but more importantly, it provides an efficient lockless resolution to conflict that does not preclude speculative execution by other threads and possibly by at least one thread in the conflict situation.

Figure 4:
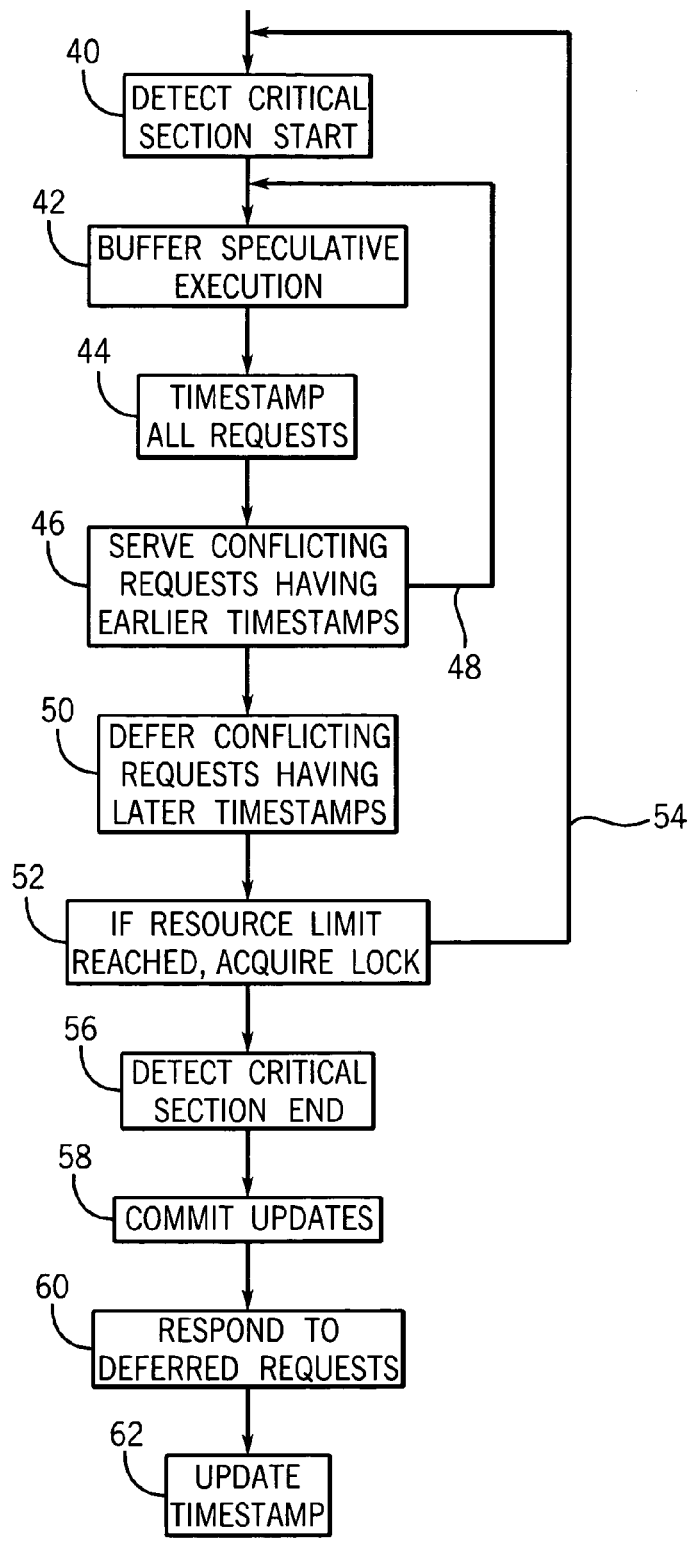
FIG. 4 is a flowchart of the steps executed by the circuitry of FIG. 3.

Referring now to FIG. 4, the conflict resolution circuitry 28 provides a globally unique clock 30 providing a value that approximately tracks the values of other globally unique clocks 30 of other processor units 12 but is in any case unique so as to primarily establish an ordering among the processor units 12 without ties and only secondarily to establish an ordering corresponding to time ordering. The value of the globally unique clock is created by a counter section 32 counting occurrences of completion of a critical section, as will be described, and a static section 33 holding a number that is a unique for each processor unit 12a. The number of the static section is used for tie breaking as will be described.

Referring now to FIGS. 1 and 4, during operation of the processor units 12, critical section detection circuitry 26 monitors executing instructions to detect a start of a critical section as indicated by process block 40.

Generally as described in the above referenced co-pending application, the critical section may be inferred by observing a pattern of instructions that are typically used for acquiring and releasing a lock variable. Often these instructions are highlighted by the use of special atomic read/modify/write instructions for the lock acquisition. The term "atomic" as used herein refers to an instruction that cannot be interrupted by another thread before completion or cannot be interrupted before completion without detection.

Typically, atomic read/modify/write instructions are readily distinguished from standard Store and Load instructions and may include the well-known Test&Set instruction or the Load Lock/Store conditional instruction. While the atomic read/modify/write instructions provide some indication of the acquisition of a lock, the indication of the release of the lock may be inferred from a Store instruction directed to the same address as the previous atomic/modify/write instruction.

Upon detection of the start of the critical section, speculative execution is begun of the critical section as indicated by process block 42, without acquisition of the lock variable. As will be understood to those of ordinary skill in the art, in such speculative execution, values to be written to shared-memory are stored in the cache L1 cache 18 without being committed (through cache L2) as part of the shared memory. Thus if a conflict occurs in the speculative execution, the values generated during the speculative execution may be discarded and the program restarted without having affected other processor units 12.

As indicated by process block 44 during the critical section all requests by the processor unit 12 for data, for example, using the standard cache coherence protocols, are time stamped with the value of the globally unique clock 30 at the time of entry into the critical section. Thus, all requests for any data needed within a single critical section by the processor unit 12 carry the same implicit priority. This time stamping means simply that the counter section 32 and static section 33 of the globally unique clock 30 is associated with the messages sent to the processor units 12b receiving that request. Importantly, these requests will include requests for ownership or sharing of data within the critical section. Data received by these requests, are associated with the time stamp of the request, the time stamp being held in cache L1 or in a state register such as that register that stores ownership status.

As indicated by process block 46, requests coming from other processor units 12b for data owned by a given processor unit 12 a are served, meaning the data owned is invalidated and sent to these requesting processor units 12b, provided the request by the other processor units 12b have a time stamp earlier than the time stamp associated with the data owned by the L1 cache of processor unit 12a. This comparison between time stamps first compares the parts of the time stamps provided by the counter sections 32 and only if counter section 32 are equal, does it compare the static section 33.

In an alternative embodiment, it may be desirable to determine whether there is only one variable in conflict, and if that is the case, at process block 46, to defer the conflicting request having the earlier time stamp until processor 12 a finishes with the variable and releases it. In this case, there can be no live lock and therefore the normal cache protocols can resolve the conflict. If there are more than one variable in conflict, the normal cache coherence mechanisms may still suffice to resolve the problem after a short wait. Accordingly, in yet another embodiment, a predetermined delay is interposed before invoking the time stamp resolution of the present invention.

At process block 46 if the data being served to another processor unit 12b has been used by the processor unit 12a, the processor unit 12a returns to the beginning of the critical section as indicated by arrow 48.

As indicated by process block 50 in the event that the request from another processor unit 12b is for data owned by the given processor unit 12a but has a later time stamp (than the stored data) that request is deferred. This deferral alternatively may be a negative acknowledgment NACK indicating that the requestor should try the request again after a bounded period of time. In the present invention however, the deferral is simply not responding and buffering the deferred request in the memory of the processor unit 12a to be responded to at a later period of time as will be described. At the time of the deferral, the globally unique clock 30 is updated with the time of the deferred request which by definition is greater.

Note that the deferred processor unit 12b need not squash its speculative execution but may simply wait for the release of the deferred variable as will be described below.

At process block 52, the resources of the processor unit 12a used during the speculative execution and by the buffering of deferred responses, is checked and if those resources are exhausted, indicating that there is no more memory to buffer speculative execution or deferred requests, speculation is stopped and the program proceeds to a default condition. This default condition may be, for example, acquiring the lock of the critical section as indicated by arrow 54 or may be signaling a failure so that other mechanisms for addressing this can be implemented.

The end of the critical section is detected at process block 56 by critical section detection circuitry 26 as has been described. It will be understood to those of ordinary skill in the art that process blocks 42, 44, 46, 50, and 52 need not be executed sequentially as shown but simply must occur between process block 40 and process block 52.

Once the end of the critical section has been reached, lock elision circuitry 24 determines whether speculative execution has occurred without conflict. If it has, at process block 58, the program commits the updates by writing values stored in L1 cache 18 to cache L2 using the acquired ownership obtained to all the necessary variables.

At process block 60, the conflict resolution circuitry 28 responds to any deferred requests by forwarding the requested data to the requesting processor unit 12. Finally, at process block 62, the globally unique clock 30 is updated by incrementing it once. Thus, the clock generally increments upon each completion of a critical section without conflict and if there is a conflict, the clock receives the value of the globally unique clock of the conflicting processor unit 12 if it is greater. These rules combined limit the amount of drift between any two globally unique clocks and ensure that no processor unit 12 is consistently denied data based on a later time stamp.

Note that in the event of misspeculation, the value of the globally unique clock is not incremented but reused for subsequent attempts at speculation.

Figure 5:
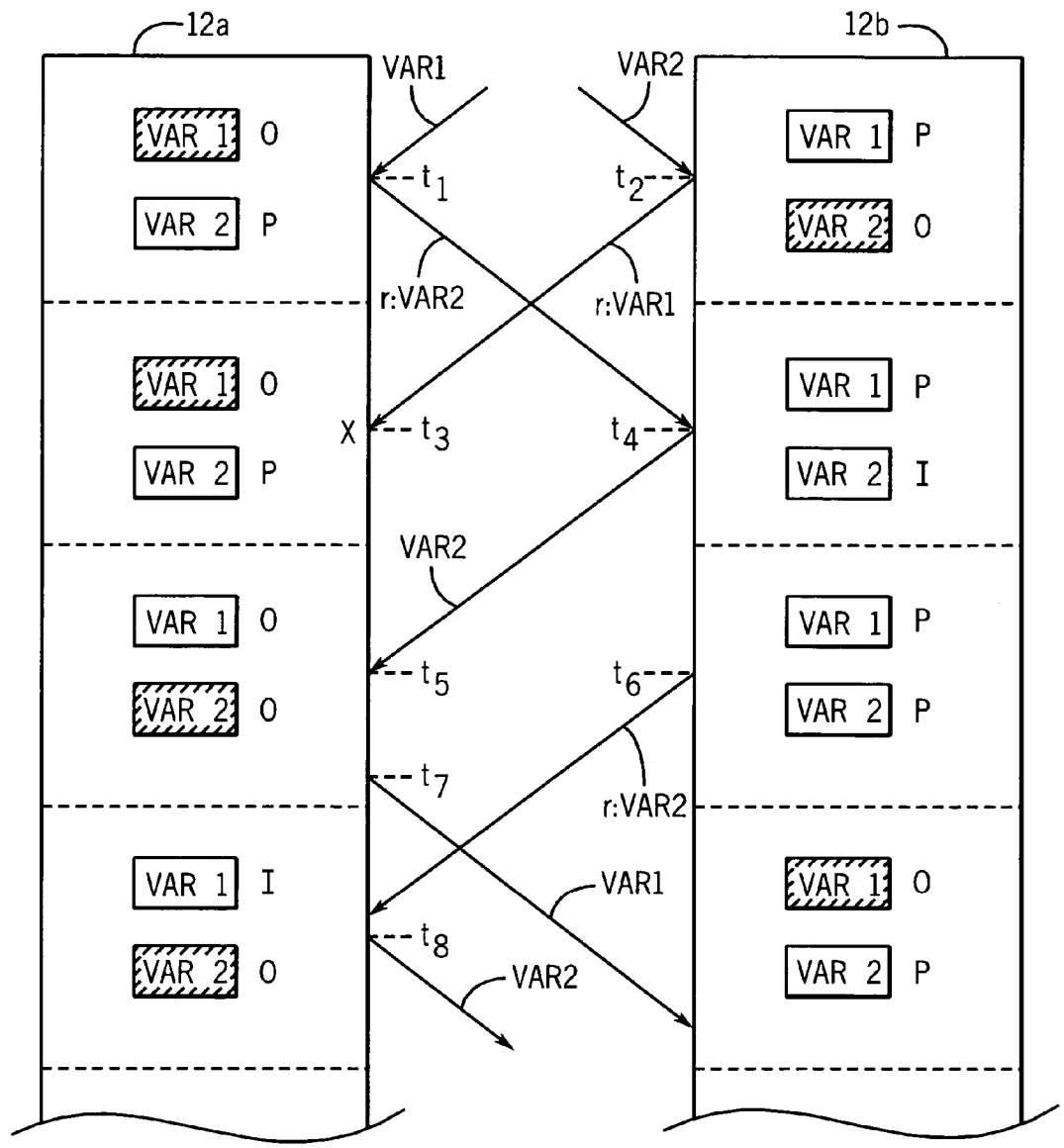
FIG. 5 is a figure similar to that of FIG. 2 showing the operation of the present invention eliminating the live-lock of FIG. 2.

Referring now to FIG. 5 the present invention avoids the live-lock described with respect to FIG. 2. As before both processor units 12a and 12b initially receive variables VAR1 and VAR2, respectively, for ownership and then submit messages r:VAR2 at time $t_1$ from processor unit 12a to processor unit 12b and messages r:VAR1 at time $t_2$ from processor unit 12b to processor unit 12a requesting the missing variable that they require.

Assuming that processor unit 12a entered the critical section before processor unit 12b, (and assuming for this example that the clocks are time ordered, an assumption that is not required for the invention to work) processor unit 12a will defer the request r:VAR1 of processor unit 12b at time $t_3$ after comparing the time stamp of the message r:VAR1 to the time stamp associated with the variable VAR1 owned by processor unit 12a (assumed here to be earlier). Processor unit 12a buffers the request r:VAR1.

At time $t_4$ processor unit 12b will receive the message r:VAR2 from processor unit 12a and will invalidate its variable VAR2 (again based on the time stamps) and forward that data to processor unit 12a to be received at time $t_5$. Processor unit 12b may then squash its speculative execution.

At time $t_6$ processor unit 12b renews its request for variable VAR2 per the first Store instruction of its critical section, which could also be deferred, but in this example, occurs after processor unit 12a has committed its speculative execution of the critical section and thus at time $t_8$ causes processor unit 12a to release variable VAR1. At $t_7$, processor unit 12a responds to the processor unit 12b's deferred request for variable VAR1 and releases that variable as well.

Importantly, during this process, there has never been an acquisition of the lock and thus other threads are free to speculatively execute.

While live-lock problems are avoided in the present invention, there is a possibility of a deadlock that may occur when there are more than two processors contesting for at least two pieces of data.

Figure 6:
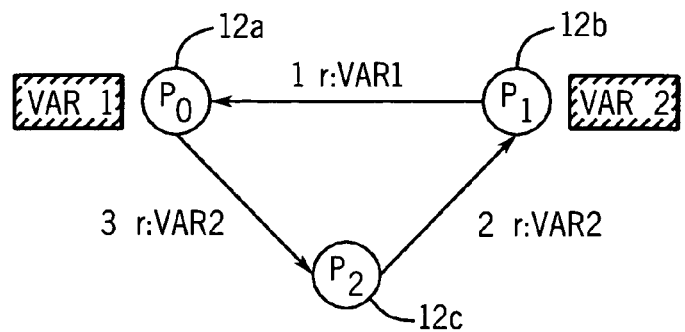
FIG. 6 is a graphical depiction of a deadlock occurring with multiple processors contending for multiple variables.

Referring now to FIG. 6 assume that there are three processor units 12a-12c, where processor units 12a and 12b are executing the critical sections previously described such that processor unit 12a has variable VAR1 for ownership and processor unit 12b has variable VAR2 for ownership.

At a first time (1) a request r:VAR1 may issue from 12b to 12c requesting variable VAR1 from processor unit 12b. At a later time (2) processor unit 12c may request r:VAR2 requesting variable B from processor unit 12b which does not release variable VAR2 because it is awaiting variable VAR1. Processor unit 12a at a third time (3) produces a request r:VAR2 for variable VAR2 from processor unit 12c not realizing the data is not yet there.

Figure 7:
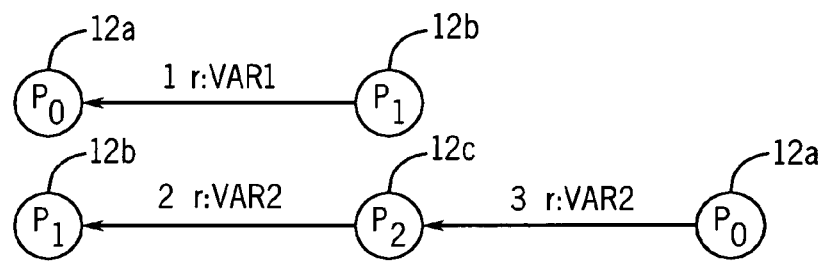
FIG. 7 is a recasting of the deadlock of FIG. 6 in separate paths for each variable.

Referring now to FIG. 7, this transaction can be decomposed into a first set of requests for variable VAR1 between processor unit 12b and 12a and a second set of requests from processor unit 12a to 12c to 12b. As illustrated by FIG. 7, in this situation, processor unit 12a has a superior claim to variable VAR2 based on its time stamp at the time of entry into the critical section, but processor unit 12b does not know that processor unit 12a is waiting for it to release the data. Accordingly, a modification to the present invention provides for two additional messages.

Figure 8:
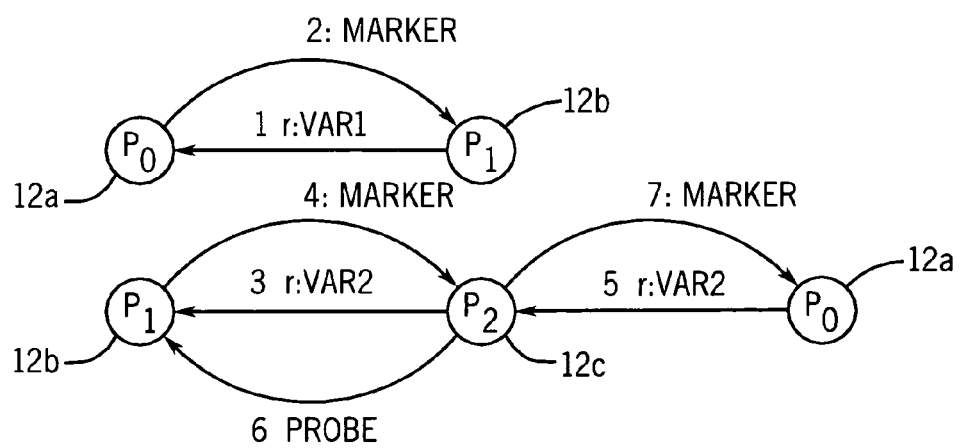
FIG. 8 is a figure similar to that of FIG. 7 showing the use of marker and probe messages to resolve the dead-lock of FIGS. 6 and 7.
Figure 9:
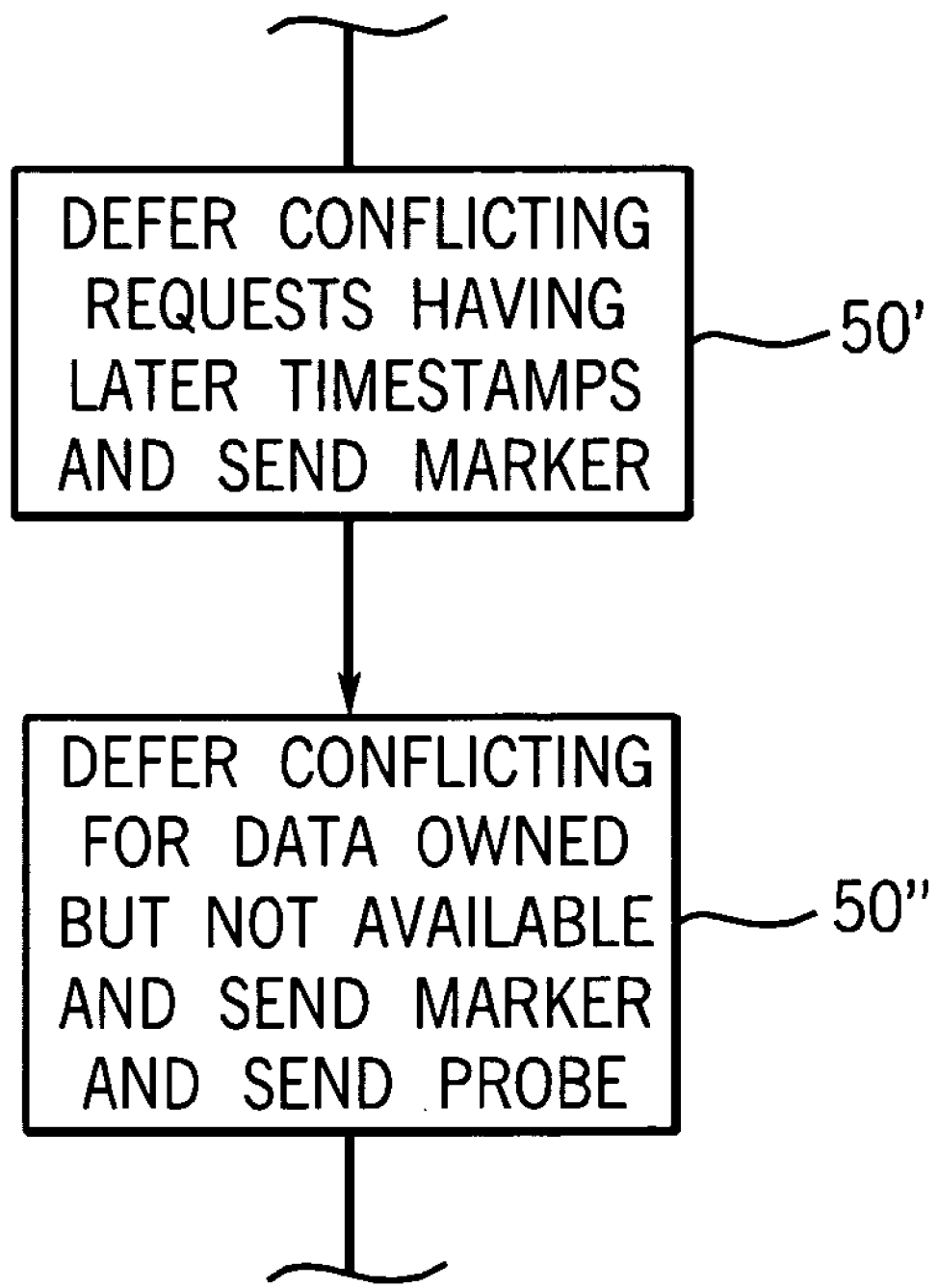
FIG. 9 is a fragmentary view of a second embodiment of the steps of FIG. 4 implementing the marker and probe messages of FIG. 9.

Referring to FIG. 8, a marker message (2:marker) (4:marker) (7:marker) is sent from any processor unit who is deferring a request by another processor unit 12 either because of its time stamp as described above or because that processor unit 12 does not have the requested data (a deferral per standard cache coherence protocols). Accordingly processor unit 12a sends a marker message (2:marker) to processor unit 12b with respect to processor unit 12b's request for variable VAR1 and processor unit 12b sends a marker message (4:marker) to processor unit 12c with respect to processor unit 12c's request for variable VAR2 and processor unit 12c sends a marker message (7:marker) to processor unit 12a with respect to processor unit 12a's request for variable VAR2. Each of these marker messages has a unique identification so that variables forwarded later in response to the marker messages with respect to the marker message may be properly identified.

Processor unit 12c also sends a probe message (6:probe) to processor unit 12b when it receives the request by processor unit 12a of variable VAR2. A probe message is sent whenever a deferral of a request results from the instant processor unit not having the data in its possession. The probe messages include the time stamp of the triggering request message, so in this case the probe message (6:probe) has the time stamp of the message 5 r:VAR2 from processor unit 12a.

Processor unit 12b seeing the probe message (6: probe) which includes the time stamp of the request from processor unit 12a uses that time stamp in its comparison and accordingly releases the data VAR2 based on the time stamp of the probe message. The released data carries with it the identification of the marker message (7:marker) so that processor unit 12a can identify the data being received to the particular request. If a processor unit 12 receives a probe message for a variable that is not cached locally, the processor may ignore the probe because this implies the data response has crossed the probe in the network. For a processor unit 12 to receive a probe message it must have already sent a marker message.

Referring to FIG. 8, the generation of the marker messages and the probe message require a splitting of process block 50 of FIG. 4 to process blocks 50' and 50" as shown. In process block 50' requests deferred for reasons of time stamps are accompanied by upstream marker messages as described and in process block 50" requests deferred for reasons of lack of data are accompanied by upstream marker messages and downstream probe messages as described.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A processor unit system for a shared-memory computer comprising:
   a processor unit;
   a local memory system executing a protocol to share data with at least one other processor unit;
   a conflicts resolution circuit executing a hardware program to:
   (i) detect a critical section in an executing program and begin speculative execution of the critical section without acquisition of a lock;
   (ii) in the event of a conflict with another processor unit executing the critical section and needing to write to data within the critical section, establishing a priority between the processor unit and another processor unit to resolve the conflict without acquisition of the lock.

2. The processor unit system of claim 1 further including:
   a clock with a globally unique clock value;
   and where the conflicts resolution circuit establishes a priority between the processor unit and another processor unit by:
   (a) time stamping requests for data sent by a first processor unit to other processor units with the globally unique clock value;
   (b) releasing owned data that is requested by a second processor unit, if the second processor is making a request with an earlier time stamp than a time stamp of a request to acquire ownership of the data by the first processor unit;
   (c) deferring release of owned data that is requested by the second processor unit, if the second processor is making a request having a later time stamp than the time stamp of the request to acquire ownership of the data by the first processor unit.

3. The processor unit system of claim 2 wherein the conflicts resolution circuit executes hardware program step (ii) only during execution of a critical section.

4. The processor unit system of claim 2 wherein the processor unit system uses a protocol of the local memory during execution of a section of the program that is not a critical section.

5. The processor unit system of claim 4 wherein the protocol of the local memory is a cache coherence protocol.

6. The processor unit system of claim 2 wherein the clock with a globally unique clock value includes a time variant field and a static processor-unit-dependant field.

7. The processor unit system of claim 2 wherein the clock with a globally unique clock value is a counter updated after executions by the processor unit of a critical section of a program subject to a lock.

8. The processor unit system of claim 7 wherein the counter sets itself to a higher number on updating.

9. The processor unit system of claim 8 wherein the counter sets itself to the time stamp of the request of the second processor unit when the release of data is deferred because the time stamp of the request of the second processor unit is later.

10. The processor unit system of claim 2 further including buffer memory storing a deferred request of the second processor unit; and
    wherein the conflicts resolution circuit further executes the hardware program to:
    (d) read buffered deferred requests at a time after a deferring to release data to the second processor unit.

11. The processor unit system of claim 10 further including:
    a critical section detection circuit detecting the start and end of execution by the processor of a critical section of a program subject to a lock; and
    wherein the later time is the completion of a critical section.

12. The processor unit system of claim 2 wherein the conflicts resolution circuit further executes the hardware program to:
    (iv) send a marker message to the second processor unit when the request by the second processor unit is deferred based on its time stamp.

13. The processor unit system of claim 2 wherein the conflicts resolution circuit further executes the hardware program to:
    (iv) send a marker message to the second processor unit when the request by the second processor unit is deferred because the requested data is not available.

14. The processor unit system of claim 13 wherein the conflicts resolution circuit further executes the hardware program to:
    (iv) send a probe message to a third processor unit containing a time stamp of the request of the second processor unit receiving the marker message.

15. The processor unit of system claim 1 wherein the conflicts resolution circuit further executes the hardware program to:
    (iv) respond to a probe message from a second processor unit that has sent the processor unit a marker message indicating that a request by the processor unit has been deferred, the probe message indicating a time stamp of a third processor unit earlier than the time stamp of the request used by processor unit to acquire that data, the probe message being from a third processor unit requesting the data from the second processor unit.

16. The processor unit system of claim 1 further including:
    a lock elision circuit executing a hardware program to:
    (i) detect the start of execution by the processor of a critical section of a program subject to a lock;
    (ii) speculatively execute the critical section without acquiring the lock;
    (iii) when a conflict for data of the critical section is detected, refer the conflict to the conflict resolution circuit, where the conflict is indicated by a request by another processor unit for data in the critical section owned by the processor unit; and
    (iv) when no conflict for data of the critical section is detected, commit the execution of the critical section.

17. The processor unit system of claim 16 wherein the conflict resolution circuit allows continued speculative execution of the critical section when the conflict is resolved by deferring the release of the data in hardware program step (iii).

18. The processor unit system of claim 16 wherein the conflict resolution circuit causes a ceasing of the speculative execution of the critical section when the conflict is resolved by releasing the data in hardware program step (iii).

19. The processor unit system of claim 16 further including buffer memory storing deferred requests from the second processor unit; and
    wherein the conflicts resolution circuit further executes the hardware program to:
    (iv) read the buffered deferred requests at a later time to release data to the second processor unit; and
    (v) cease the speculative execution of the critical section when buffer memory is exhausted.

20. The processor unit system of claim 16 including buffer memory storing the results of speculative execution; and
    wherein the lock elision circuit further executes the hardware program to: (iv) cease the speculative execution of the critical section when buffer memory is exhausted.

21. A processor unit for a shared-memory computer comprising: a processor;
    a local memory system executing a protocol to share data with at least one other processor unit;
    a conflicts resolution circuit executing a hardware program to resolve conflicts between different processor units;
    a lock elision circuit executing a hardware program to:
    (i) detect the start of execution by the processor of a critical section of a program subject to a lock;
    (ii) speculatively execute the critical section without acquiring the lock;
    (iii) when a conflict for data of the critical section is detected, refer the conflict to the conflict resolution circuit, where the conflict is indicated by a request by another processor unit for data in the critical section owned by the processor unit; and
    (iv) when no conflict for data of the critical section is detected, commit the execution of the critical section.

* * * * *